(12) United States Patent
Tetsuro

(10) Patent No.: US 6,180,055 B1
(45) Date of Patent: Jan. 30, 2001

(54) LEAD-FREE SOLDER ALLOY

(75) Inventor: Nishimura Tetsuro, Suita (JP)

(73) Assignee: Nihon Superior Sha Co., Ltd. (JP)

( * ) Notice: Under 35 U.S.C. 154(b), the term of this patent shall be extended for 0 days.

(21) Appl. No.: 09/450,632

(22) Filed: Nov. 24, 1999

(30) Foreign Application Priority Data

Mar. 26, 1998 (JP) .................................................. 10-100141
Oct. 28, 1998 (JP) .................................................. 10-324482
Oct. 28, 1998 (JP) .................................................. 10-324483

(51) Int. Cl.$^7$ .................................................. C22C 13/00
(52) U.S. Cl. .................................................. 420/560
(58) Field of Search .............................................. 420/560

(56) References Cited

U.S. PATENT DOCUMENTS

| | | | |
|---|---|---|---|
| 3,481,795 | * 12/1969 | Lane | 136/237 |
| 4,248,905 | * 2/1981 | Harvey et al. | 427/11 |
| 4,358,884 | * 11/1982 | Harvey et al. | 29/402.18 |
| 4,506,822 | * 3/1985 | Hammersand et al. | 228/200 |
| 5,066,544 | * 11/1991 | Betrabet et al. | 428/614 |
| 5,094,700 | * 3/1992 | Sekhar | 148/12.9 |
| 5,125,574 | * 6/1992 | Anderson et al. | 239/8 |
| 5,344,607 | * 9/1994 | Gonya et al. | 420/562 |
| 5,429,689 | * 7/1995 | Shangguan et al. | 148/400 |
| 5,520,752 | * 5/1996 | Lucey, Jr. et al. | 148/400 |
| 5,527,628 | * 6/1996 | Anderson et al. | 428/647 |
| 5,817,194 | * 10/1998 | Nagai et al. | 148/400 |
| 5,837,191 | * 11/1998 | Gickler | 420/560 |
| 5,863,493 | * 1/1999 | Achari et al. | 420/557 |

OTHER PUBLICATIONS

Kuo et al, "Fatigue Deformation of In–situ Composite Solders", Microstructures and Mechanical Properties of Aging Material, pp. 417–423, 1993.*

Kuo et al, "Tensile and Creep Properties of In–situ Composite Solders", Microstructures and Mechanical Properties of Aging Material, pp. 409–415, 1993.*

Wienbel et al, "Creep–fatigue Interaction in Eutectic Lead–Tin Solder Alloy" Journal of Materials Science, vol. 22, pp. 3901–3906, 1987.*

Wasynczuk et al, "Shear Creep of Cu6Sn5/Sn–Pb Eutectic Composites", Proceeding of Technical Program National Electronic Packaging and Production Conference, vol. III, pp. 1245–1255, 1992.*

Tien et al, "Creep–Fatigue Interactions in Solders", IEEE, vol. 12 No. 4, pp 502–505, 1989.*

Shine et al, "Fatigue of Solder Joints in Surface Mount Devices", Low Cycle Fatigue ASTM STP 942, pp 588–610, 1988.*

Shangguan et al, Evaluation of Lead–Free Eutectic Sn–Ag Solder for Automotive Electronics Packaging Applications, IEEE, pp 25–37, 1994.*

Sastry et al, "Microstructures and Mechanical Properties of In–situ Composite Solders", Proceeding of Technical Program National Electronic Packaging and Production Conference, vol. III, pp 1266–1275, 1992.*

Pinizotto et al, "Microstructural Development in Composite Solders Caused by Long Time High Temperature Annealing", Proceeding of Technical Program NEPCON WEST, Anaheim, CA, pp 1284–1298, 1992.*

(List continued on next page.)

Primary Examiner—Roy V. King
Assistant Examiner—Janelle Combs Morillo
(74) Attorney, Agent, or Firm—Thompson Hine & Flory LLP

(57) ABSTRACT

A lead-free solder which is comprised of three elements Sn-Cu-Ni. Cu and Ni are 0.1–2 wt % and 0.002–1 wt % respectively. Preferable weight percentage of Cu and Ni are 0.3 to 0.7 percent and 0.04 to 0.1 percent respectively. Both methods of additive Ni to a base alloy of Sn—Cu and additive Cu to a base alloy of Sn—Ni are applicable.

12 Claims, 1 Drawing Sheet

OTHER PUBLICATIONS

McCormack et al, "Enhanced Solder Alloy Performance by Magnetic Dispersions", IEEE, vol. 17 A, No. 3, pp 452–457, 1997.*

McCormack et al, "The Design and Properties of New, Pb–Free Solder Alloys", IEEE/CPMT Int'l Electronic Manufacturing Technology Symposium, pp 7–14, 1994.*

Marshall et al, "Microcharacterization of Composite Solders", Proceeding of Technical Program National Electronic Packaging and Production Conference, vol. III, pp 1278–1283, 1992.*

Marshall et al, "Composite Solders", IEEE vol. 14, No. 4, pp 698–702, 1991.*

Lau et al, "Solder Joint Fatigue in Surface Mount Technology: State of the Art", Solid State Technology, pp 91–104, 1985.*

Fear et al, "Thermal Fatigue in Solder Joints", Journal of Metals, pp 18–22, 1988.*

Clough et al, "Preparation and Properties of Reflowed Paste and Bulk Composite Solder", Proceedings NEPCON West Cahners Exhibition Group, pp 1256–1265, 1992.*

Betrabet et al, "Towards Increased Fatigue Resistance in Sn–Pb Solders by Dispersion Strengthing", Proceeding of Technical Program National Electronic Packaging and Production Conference, vol. III, pp 1276–1277, 1992.*

Betrabet et al, "Processing Dispersion–Strengthened Sn–Pb Solders to Achieve Microstructural Refinement and Stability", Script Metallurgica et Materialia, vol. 25, pp. 2323–2328, 1991.*

Attarwala et al, "Confirmation of Creep and Fatigue Damage in PB/Sn Solder Joints" Journal of Electronic Packaging, vol. 114, 1992.*

Ho et al, "Carbon Fiber Reinforced Tin–Lead Alloy as a Low Thermal Expansion Solder Preform", J. Mater. Res. vol. 5, No. 6, pp 1266–1270, 1990.*

* cited by examiner

LEAD-FREE SOLDER ALLOY

CROSS REFERENCE TO RELATED APPLICATIONS

This application claims priority from related Patent Cooperation Treaty application PCT/JP 99/01229 filed Mar. 15, 1999 that claims priority from related Japanese Patent Applications No. 10-324482 filed Oct. 28, 1998; 10-324483 filed Oct. 28 1998; and 10-100141 filed Mar. 26, 1998.

BACKGROUND OF THE INVENTION

1. Field of the Invention

The present invention relates to the composition of a novel lead-free solder alloy.

2. Description of the Related Art

In the solder alloy, lead has been conventionally an important metal for diluting tin to improve flow factor and wettability. Obviating the use of lead, a toxic, heavy metal, is preferred in consideration of working environments in which soldering operation is performed, operating environments in which soldered products are used, and the earth friendly to which solder is released. Avoiding the use of lead in solder alloy is thus noticeable practice.

When a lead-free solder alloy is formed, the alloy is required to have wettability to metals to be soldered. Tin having such wettability is an indispensable metal as a base material. In the formation of a lead-free solder alloy, it is important to fully exploit the property of tin and to determine the content of an additive metal for the purpose of imparting, to the lead-free solder alloy, strength and flexibility as good as those of the conventional tin-lead eutectic alloy.

SUMMARY OF THE INVENTION

Accordingly, it is an object of the present invention to provide a lead-free solder alloy having tin as a base material with other additive materials that are easily gettable as good as the conventional tin-lead eutectic alloy, and offers a stable and liable solder joint.

To achieve the object of the present invention, the solder alloy is preferably formed of three metals of 0.1–2 weight percent (hereinafter wt %) Cu, 0.002–1 wt % Ni and the remaining wt % Sn. Of these elements, tin has a melting point of about 232° C., and is an indispensable metal to impart wettability of the alloy against the metals to be soldered. A tin-based alloy, without lead of a large specific gravity, is light in its molten state, and cannot offer enough flowability to be appropriate for a nozzle-type soldering operation. The crystalline structure of such solder alloy is too soft and not mechanically strong enough. By additive of copper the alloy reinforces strongly. The addition of approximately 0.7% copper added to tin forms an eutectic alloy having a melting point of approximately 227° C., which is lower than that of tin alone by approximately 5° C. The addition of copper restrains copper leaching in which copper, a typical base material of lead wire, leaches out of the surface of the lead wire in the course of soldering operations. At a soldering temperature of 260° C., for example, the copper leaching rate of the copper-added alloy is half as high as the copper leaching rate in the tin-lead eutectic solder. Restraining the copper leaching reduces a copper density difference present in a soldering area, thereby slowing the growth of a brittle compound layer.

The addition of copper is effective to prevent a rapid change in composition in the alloy itself when using a long period on a dipping method.

The optimum amount of additive copper is within a range of 0.3–0.7 wt %, and if more copper is added, the melting temperature of the solder alloy rises. The higher the melting point, the higher the soldering temperature needs to be. A high soldering temperature is not preferable to thermally weak electronic components. Typical soldering temperature upper limit is considered to be 300° C. or so. With the liquidus temperature of 300° C., the amount of additive copper is about 2 wt %. The preferable value and limits are set as the above.

In the present invention, not only a small amount of copper is added to tin as a base material, but also 0.002–1 wt % nickel is added. Nickel controls intermetallic compounds such as $Cu_6Sn_5$ and $Cu_3Sn$, which are developed as a result of reaction of tin and copper, and dissolves the developed compounds. As such intermetallic compounds have a high temperature melting point, they hinder flowability of milting solder and make solder function declined. Therefore, if these intermetallic compounds remain on patterns at a soldering operation, these become to be so-called bridge that shorts conductors. Namely, needle-like projections remains when leaving from melting solder. To avoid such problems, nickel is added. Although nickel itself produces intermetallic compound with tin, copper and nickel are always solid soluble at any ratio. Therefore, nickel cooperates with the development of Sn—Cu intermetallic compounds. Since the addition of copper to tin helps the alloy to improve its property as a solder compound in the present invention, a large amount of Sn—Cu intermetallic compounds is not preferable. For this reason, nickel, in an all-ratio solid soluble relationship with copper, is thus employed to control the reaction of copper with tin.

The liquidus temperature rises if nickel is added because a melting point of nickel is high. In consideration of the typical permissible upper temperature limit, the amount of additive nickel is limited to 1 wt %. It was learned for an inventor that the amount of additive nickel as low as or greater than 0.002 wt % held a good flowability and solderability showed a sufficient strength of a soldered joint. According to the present invention, a lower limit of the amount of additive nickel is thus 0.002 wt %.

In the above process, Ni is added to the Sn—Cu alloy. Alternatively, Cu may be added to an Sn—Ni alloy. When nickel alone is slowly added to tin, according to the raising up of a melting point, the flow factor drops in its molten state by reason of producing intermetallic compounds. By adding copper, the alloy has a smooth property with an improved flow factor but some degree of viscosity. In either process, the interaction of copper and nickel helps create a preferable state in the alloy. The same solder alloy is therefore created not only by adding Ni to the Sn—Cu base alloy but also by adding Cu to the Sn—Ni base alloy.

Referring to FIG. 1, a range of 0.002–1 wt % nickel and a range of 0.1–2 wt % copper result in a good solder joint. When the base alloy is Sn—Cu, the content of copper represented by the X axis is limited to a constant value within a range of 0.1–2 wt %. If the content of nickel is varied within a range of 0.002–1 wt % with the copper content limited to within a range of 0.1–2 wt %, a good solder alloy is obtained. When the base alloy is Sn—Ni, the content of nickel represented by the Y axis is limited to a constant value within a range of 0.002–1 wt %. If the content of copper is varied within a range of 0.1–2 wt %, a good solder alloy is obtained. These ranges remain unchanged even if an unavoidable impurity, which obstructs the function of nickel, is mixed in the alloy.

Germanium has a melting point of 936° C., and dissolves in only a trace amount into the Sn—Cu alloy. Germanium makes the crystal finer when the alloy solidifies. Germanium appears on a grain boundary, preventing the crystal from becoming coarse. The addition of germanium prevents oxide compounds from developing during the solution process of the alloy. However, the addition of germanium in excess of 1 wt % not only costs much, but also makes an oversaturation state, hindering the molten alloy from spreading uniformly. Excess germanium above the limit does more harm than good. For this reason, the upper limit of the content of germanium is thus determined.

DESCRIPTION OF THE PREFERRED EMBODIMENTS

Figure 1:
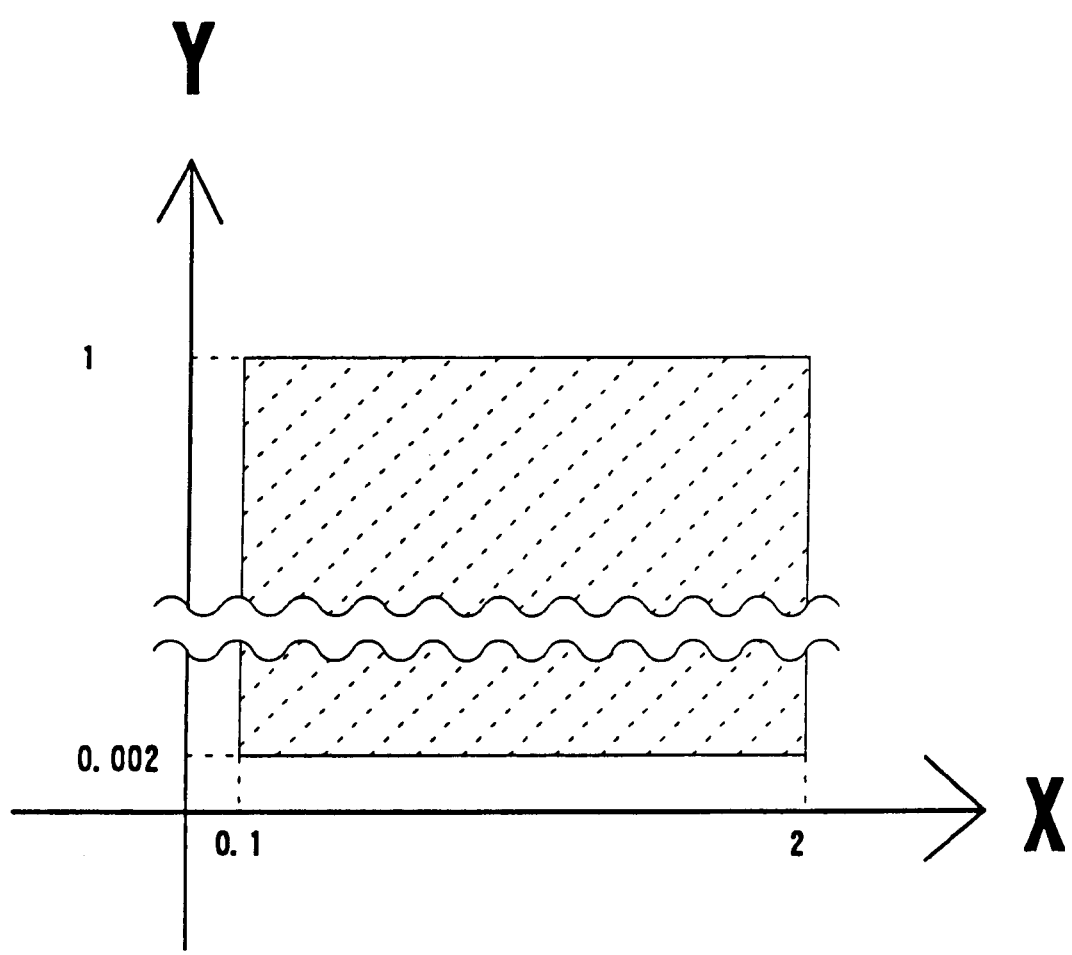
FIG. 1 is a graph showing proper ranges of additive metals.

The physical properties of solder alloys having the composition of the present invention are listed in Table. The alloy of 0.6 wt % Cu, 0.1 wt % Ni, and the remaining percent Sn, which the inventors consider one of the proper compositions of solder alloy, was prepared.

Melting point:

Its liquidus temperature was approximately 227° C. and its solidus temperature was approximately 227° C. Tests were conducted using a differential thermal analyzer at a temperature rise rate of 20° C./minute.

Specific gravity:

The specific gravity of the alloy, measured using a specific gravity meter, was approximately 7.4.

Tensile test under a 25° C. room temperature atmosphere:

The tensile strength of the alloy was 3.3 kgf/mm$^2$ with a stretch of approximately 48%. The conventional Sn—Pb eutectic solder alloy, tested under almost the same conditions, exhibited a strength of 4–5 kgf/mm$^2$. The alloy of the present invention has a tensile strength lower than that of the conventional solder alloy. However, considering that the solder alloy of the present invention is chiefly intended to solder relatively light-weight electronic components onto a printed circuit board, the solder alloy of the present invention meets strength requirement as long as the application is limited to this field.

Spreading test:

The alloy, measured under JIS (Japanese Industrial Standards) Z3197 Test Standard, exhibited 77.6% at 240° C., 81.6% at 260° C., and 83.0% at 280° C. Compared with the conventional tin-lead eutectic solder, the solder alloy of the present invention offers a small spreading factor, but is still sufficiently acceptable.

Wettability test:

A copper strip of 7×20×0.3 mm was subjected to acid cleaning using 2% diluted hydrochloric acid and was tested for wettability under the conditions of a dipping rate of 15 mm/second, a dip depth of 4 mm, and a dipping time of 5 seconds, using a wettability test apparatus. The zero crossing time and maximum wetting force of the alloy were 1.51 seconds and 0.27 N/m at 240° C., 0.93 second and 0.3 N/m at 250° C., 0.58 second and 0.33 N/m at 260° C., and 0.43 second and 0.33 N/m at 270° C. From these results, the start of wetting is late at higher melting points, compared with the eutectic solder, but the wetting speed increases as the temperature rises. Since the metals to be soldered have typically low heat capacity in practice, the delay of the start of wetting presents no problem.

Peel test:

QFP lead peel tests showed a peel strength of approximately 0.9 kgf/pin. A visual check to the peeled portion revealed that all peelings took place between a board and a copper land. This showed that the solder joint had a sufficient strength.

Electric resistance test:

A wire solder of 0.8 mm diameter and 1 meter long was measured using the four-terminal measurement method. Its resistance was 0.13 $\mu\Omega$. The resistance of the wire solder was close to that of tin. A low resistance increases the velocity of propagation of electrons, improving high-frequency characteristics, and changing acoustic characteristics. Measured under the same conditions, a tin-lead eutectic solder alloy had an electric resistances of 0.17 $\mu\Omega$ and a tin-silver-copper solder had an electric resistance of 0.15 $\mu\Omega$.

Creep strength test:

A tin-plated brass pin having a 0.8×0.8 mm square cross section was flow-soldered onto a land of a 3 mm diameter with a hole of a diameter of 1 mm formed on a paper phenolic board. A weight of 1 kg was hung on the pin using a stainless steel wire in a temperature-controlled bath until the pin dropped out of the solder joint. With the bath temperature at 145° C., the pin remained connected over 300 hours. At 180° C., the pin did not fall even after 300 hours had passed. The pin connected by the tin-lead eutectic solder joint dropped within several minutes to several hours under the same conditions. Different from the Pb including solder, the solder alloy of the present invention has resistance to creep even if its tensile strength is low, and the reliability of the solder alloy of the present invention is particularly excellent under the high-temperature atmosphere.

Heat shock test:

An hour of heat shock at −40° C. and +80° C. was given to the solder alloy. The solder alloy withstood 1000 cycles of shocks. The conventional tin-lead eutectic solder alloy withstood 500–600 cycles of shocks.

Migration test:

A type II comb-like test specimen specified JIS Standard was dip-soldered using RMA flux. Flux residues are cleaned, and resistance was measured with a terminal attached to a lead wire. This measurement result was treated as an initial value. The test specimen was introduced into a thermohygrostat, and rated direct currents were applied for 1000 hours to measure resistance at predetermined time intervals while the test specimen was observed using a magnifier with a magnification of 20 times. No abnormal change was observed both when 100 VDC current was applied at 40° C. and a humidity of 95% and when 50 VDC current was applied at 85° C. and a humidity of 85%. This means that the alloy of the present invention performed as well as the conventional tin-lead eutectic solder.

Leaching test:

A copper wire of 0.18 mm diameter with RA type flux attached thereto was dipped in a solder bath filled with molten solder at 260±2° C. The copper wire was agitated until it disappeared by leaching, and the time to the full leaching was counted using a stopwatch. The full leaching of the copper wire in the solder of the present invention took about 2 minutes while the identical copper wire leached in the tin-lead eutectic solder for about 1 minute. It is apparent that the longer resistance to the leaching was attributed to the addition of an adequate amount of copper. Specifically, the originally added copper that had leached resulted a relatively slow copper leaching rate regardless of a large content of tin. Another likely reason for the slow leaching rate was that the melting point of the solder was higher than the eutectic solder by approximately 40° C.

The melting point and strength of the alloy having another composition is listed in Table.

Studying the above tests results, compared with a comparative example, all examples of the present invention present satisfactory results. The conventional tin-lead eutectic solder alloy, measured under the same conditions, exhibited a strength of 4–5 kgf/mm$^2$. All examples exhibited strength values lower than that of the conventional tin-lead eutectic solder alloy. As already described, the solder alloy of the present invention is chiefly intended to solder relatively light-weight electronic components onto a printed circuit board, and the solder alloy of the present invention meets strength requirement as long as the application is limited to this field.

No particular data were taken about the spreading of the samples. The addition of nickel imparted a smooth surface structure to the alloy itself. Since the smooth surface was maintained after solidification, the spreading was considered good.

The melting point are represented by two temperatures, in which a lower one is a solidus temperature while a higher one is a liquidus temperature. The smaller the temperature difference between the two, the less a component to be soldered moves during solder solidification prior to the soldering operation, and the stabler the solder joint. This is also true of the conventional tin-lead solder. However, which solder outperforms which is not generally determined. Depending on the application of solder, a solder alloy having an adequate temperature difference may be employed.

Wettability to the copper, one of the important characteristics of solder, is good with the RMA type flux. A good wettability is thus assured using the RMA type flux.

The three-element Sn—Cu—Ni solder of the present invention may be progressively formed by preparing the Sn—Ni base alloy and mixing a molten Sn—Cu solder with the base alloy for uniform diffusion. As already described, the melting point of nickel is high. When pure nickel is introduced into the Sn—Cu alloy, dissolving and diffusing nickel uniformly is difficult. To prepare the alloy of the present invention, the base alloy is beforehand melted at a relatively high temperature so that nickel is sufficiently mixed with tin, and the base alloy is then introduced into the molten Sn—Cu bath. In this way, the lead-free solder alloy in which nickel is diffused into tin at a relatively low temperature is obtained.

Forming beforehand the Sn—Ni base alloy helps prevent other unwanted metals from being included thereinto. The present invention takes advantage of the fact that nickel is in an all-ratio solid soluble relationship with copper and that the alloy of copper and nickel controls the development of bridges. The presence of any metal in the alloy that hinders the function of nickel is not preferred. In other words, the addition of any metal other than copper, which may easily cooperate with nickel is not preferred in the present invention.

Although the lead-free solder of the present invention suffers a slow start of wetting because of a melting point higher than that of the conventional tin-lead eutectic solder, the lead-free solder of the present invention forms an interfacial alloy layer quickly and reliably in accordance with a variety of surface processes once the wetting starts. The lead-free solder alloy of the present invention has a creep strength high enough to support bulky and heavy components and heat-generating components. Since the copper leaching, which is considered serious in the conventional solder alloy, is alleviated, the durability of lead wires is substantially increased.

Because of its high electric and thermal conductivities, the lead-free solder of the present invention imparts high-speed property and high heat dissipation property to electric components, and improves acoustic characteristics of electric components.

Since the lead-free solder of the present invention does not include, in its composition, bismuth, zinc, and indium, it is free from an abnormal reaction with a coating containing lead that is soluble from a terminal materials, other lead-free solder coating such as Sn—Ag solder, Sn—Bi solder, and Sn—Cu solder. This means that the continuous use of a solder bath is assured and lead-rich wires compatible with lead are used without any problem when the conventional tin-lead solder is switched to the lead-free solder alloy of the present invention.

TABLE

|  | Compounds | | | | | Melting point | Strength | Rate of stretch |
|---|---|---|---|---|---|---|---|---|
|  | Sn | Cu | Ni | Ga | Ge | deg. C | kgf/mm2 | % |
| Sample | | | | | | | | |
| 1 | remain | 0.5 | 0.05 | | | 227/232 | 3.4 | 36 |
| 2 | remain | 0.5 | 0.1 | | | 227/232 | 3.4 | 42 |
| 3 | remain | 0.5 | 1 | | | 229/233 | 3.5 | 33 |
| 4 | remain | 0.6 | 0.05 | | | 227/231 | 3.3 | 48 |
| 5 | remain | 0.7 | 0.4 | | | 227/231 | 3.4 | 40 |
| 6 | remain | 2 | 0.02 | | | 227/245 | 3.4 | 24 |
| 7 | remain | 0.5 | 0.05 | 0.01 | 0.02 | 227/235 | 3.3 | 46 |
| 8 | remain | 0.5 | 0.05 | | 0.1 | 227/236 | 3.2 | 38 |
| 9 | remain | 0.5 | 0.05 | | 0.3 | 227/236 | 3.3 | 35 |
| Comparative Sample | | | | | | | | |
| A | remain | 0.5 | | | | 227/232 | 3 | 23 |
| B | remain | 0.7 | | | | 227/231 | 3.1 | 20 |

What is claimed is:

1. A lead-free solder alloy consisting essentially of 0.1–2 wt % Cu, 0.002–1 wt % Ni and the remaining percent Sn.

2. A lead-free solder alloy according to claim 1, wherein the weight percentage of Cu falls within a range from 0.3 to 0.7 percent.

3. A lead-free solder alloy according to claim 2, wherein the weight percentage of Ni falls within a range from 0.04 to 0.1 percent.

4. A lead-free solder alloy according to claim 1 wherein Ni is added to a base alloy of Sn—Cu.

5. A lead-free solder alloy according to claim 2 wherein Ni is added to a base alloy of Sn—Cu.

6. A lead-free solder alloy according to claim 3 wherein Ni is added to a base alloy of Sn—Cu.

7. A lead-free solder alloy according to claim 1 wherein Cu is added to a base alloy of Sn—Ni.

8. A lead-free solder alloy according to claim 2 wherein Cu is added to a base alloy of Sn—Ni.

9. A lead-free solder alloy according to claim 3 wherein Cu is added to a base alloy of Sn—Ni.

10. A lead-free solder alloy comprising 0.1–2 wt % Cu, 0.002–1 wt % Ni, 0.001–1 wt % Ge, and the remaining percent Sn.

11. A lead-free solder alloy according to claim 10 wherein the weight percentage of Cu falls within a range from 0.3 to 0.7 percent.

12. A lead-free solder alloy according to claim 11 wherein the weight percentage of Ni falls within a range from 0.04 to 0.1 percent.

* * * * *

(12) EX PARTE REEXAMINATION CERTIFICATE (5591st)
United States Patent
Tetsuro

(10) Number: US 6,180,055 C1
(45) Certificate Issued: Oct. 31, 2006

(54) LEAD-FREE SOLDER ALLOY

(75) Inventor: Nishimura Tetsuro, Suita (JP)

(73) Assignee: Nihon Superior Sha Co., Ltd., Suita (JP)

Reexamination Request:
No. 90/006,661, Jun. 9, 2003

Reexamination Certificate for:
Patent No.: 6,180,055
Issued: Jan. 30, 2001
Appl. No.: 09/450,632
Filed: Nov. 24, 1999

Related U.S. Application Data

(63) Continuation of application No. PCT/JP99/01229, filed on Mar. 15, 1999.

(30) Foreign Application Priority Data

Mar. 26, 1998 (JP) .......................... 10-100141
Oct. 28, 1998 (JP) .......................... 10-324482
Oct. 28, 1998 (JP) .......................... 10-324483

(51) Int. Cl.
*C22C 13/00* (2006.01)

(52) U.S. Cl. .................................. 420/560
(58) Field of Classification Search ............... 420/560
See application file for complete search history.

(56) References Cited

U.S. PATENT DOCUMENTS

| | | | |
|---|---|---|---|
| 3,481,795 A * | 12/1969 | Lane | 136/237 |
| 4,218,245 A | 8/1980 | Batova et al. | 75/170 |
| 4,248,905 A * | 2/1981 | Harvey | 427/11 |
| RE30,854 E | 1/1982 | Plewes et al. | 75/154 |
| 4,358,884 A * | 11/1982 | Harvey et al. | 29/402.18 |
| 4,506,822 A * | 3/1985 | Hammersand et al. | 228/200 |
| 4,717,539 A | 1/1988 | Morisey | 420/457 |
| 5,019,336 A | 5/1991 | Liebermann et al. | 420/557 |
| 5,066,544 A * | 11/1991 | Betrabet et al. | 428/614 |
| 5,094,700 A * | 3/1992 | Sekhar | 148/538 |
| 5,125,574 A * | 6/1992 | Anderson et al. | 239/8 |
| 5,344,607 A * | 9/1994 | Gonya et al. | 420/562 |
| 5,366,692 A | 11/1994 | Ogashiwa | 420/565 |
| 5,429,689 A * | 7/1995 | Shangguan et al. | 148/400 |
| 5,439,639 A | 8/1995 | Vianco et al. | 420/562 |
| 5,520,752 A * | 5/1996 | Lucey et al. | 148/400 |
| 5,527,628 A * | 6/1996 | Anderson et al. | 428/647 |
| 5,817,194 A * | 10/1998 | Nagai et al. | 148/400 |
| 5,837,191 A * | 11/1998 | Gickler | 420/560 |
| 5,863,493 A * | 1/1999 | Achari et al. | 420/557 |
| 6,139,979 A * | 10/2000 | Takaoka et al. | 428/646 |
| 6,156,132 A * | 12/2000 | Yamashita et al. | 148/400 |
| 6,179,935 B1 * | 1/2001 | Yamashita et al. | 148/400 |

FOREIGN PATENT DOCUMENTS

| | | |
|---|---|---|
| JP | 3 28996 | 4/1991 |
| JP | 8 17836 | 1/1996 |

OTHER PUBLICATIONS

Kuo et al, "Fatigue Deformation of In–situ Composite Solders", Microstructures and Mechanical Properties of Aging material, pp. 417–423, Dec. 1993.*

Kuo et al, "Tensile and Creep Properties of In–situ Composite Solders", Microstructures and Mechanical Properties of Aging material, pp. 409–415, Dec. 1993.*

Wienbel et al, "Creep–fatigue Interaction in Eutectic Lead–Tin Solder Alloy", Journal of Materials Science, vol. 22, pp. 3901–3906, Dec. 1987.*

Wasynczuk et al "Shear Creep of Cu6Sn5/Sn–Pb Eutectic Composites", Proceeding of Technical Program National Electronic Packaging and Production Conference, vol. III, pp. 1245–1255, Dec. 1992.*

(Continued)

*Primary Examiner*—Scott Kastler

(57) ABSTRACT

A lead-free solder which is comprised of three elements Sn-Cu-Ni. Cu and Ni are 0.1–2 wt % and 0.002–1 wt % respectively. Preferable weight percentage of Cu and Ni are 0.3 to 0.7 percent and 0.04 to 0.1 percent respectively. Both methods of additive Ni to a base alloy of Sn—Cu and additive Cu to a base alloy of Sn—Ni are applicable.

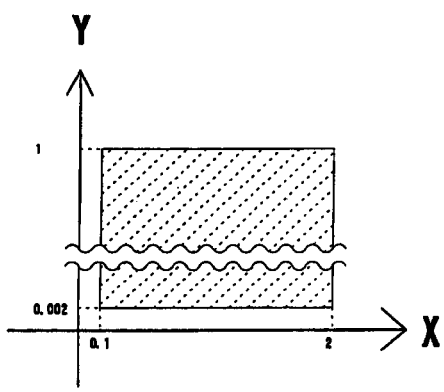

OTHER PUBLICATIONS

Tien et al, "Creep–Fatigue Interactions in Solders", IEEE, vol. 12 No. 4, pp. 502–505, Dec. 1989.*

Shine et al, "Fatigue of Solder Joints in Surface Mount Devices", Low Cycle Fatigue ASTM STP 942, pp. 588–610, Dec. 1988.*

Shangguan et al, Evaluation of Lead–Free Eutectice Sn–Ag Solder for Automotive Electronics Packaging Applications, IEEE, pp. 25–37, Dec. 1994.*

Sastry et al, "Microstructures and Mechanical Properties of In–situ Composite Solders", Proceeding of Techinical Program National Electronic Packaging and Production Conference, vol. III, pp. 1266–1275, Dec. 1992.*

Pinizotto et al, "Microstructural Development in Composite Solders Caused by Long Time High Temperature Annealing", Proceeding of Techinical Program NEPCON WEST, Anaheim, CA, pp. 1284–1298, Dec. 1992.*

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 5–9:

This application [claims priority from related] *is a continuation of* Patent Cooperation Treaty application PCT/JP 99/01229 filed Mar. 15, 1999 that claims priority from related Japanese Patent Applications No. 10-324482 filed Oct. 28, 1998; 10-324483 filed Oct. 28, 1998; and 10-100141 filed Mar. 26, 1998.

AS A RESULT OF REEXAMINATION, IT HAS BEEN DETERMINED THAT:

The patentability of claims 3, 6 and 9 is confirmed.

Claims 1, 2, 4, 5, 7, 8, 11 and 12 are cancelled.

Claim 10 is determined to be patentable as amended.

New claims 13 and 14 are added and determined to be patentable.

10. A lead-free solder alloy [comprising 0.1–2] *consisting essentially of 0.3 to 0.7* wt % Cu, [0.002–1] *0.04 to 0.1* wt % Ni, 0.001–1 wt % Ge, and the remaining percent Sn.

*13. The lead-free solder alloy of claim 3 wherein the lead-free solder alloy consists of 0.3 to 0.7 wt. % Cu, 0.04 to 0.1 wt % Ni and the remaining percent Sn.*

*14. A lead-free solder alloy according to claim 10 wherein the lead-free solder alloy consists of 0.3 to 0.7 wt. % Cu, 0.04 to 0.1 wt. % Ni, 0.001–1 wt. % Ge and the remaining percent Sn.*

* * * * *